United States Patent
Roy et al.

(10) Patent No.: US 10,903,898 B1
(45) Date of Patent: Jan. 26, 2021

(54) CHANGING ANTENNA DIRECTION BASED ON SATELLITE BLOCKAGE DETECTION

(71) Applicant: Hughes Network Systems, LLC, Germantown, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/530,483

(22) Filed: Aug. 2, 2019

(51) Int. Cl.
*H04B 7/185* (2006.01)

(52) U.S. Cl.
CPC ..... *H04B 7/18536* (2013.01); *H04B 7/18528* (2013.01); *H04B 7/18556* (2013.01)

(58) Field of Classification Search
CPC .. H04B 7/155; H04B 7/18513; H04B 7/1851; H04B 7/18517; H04B 7/18519; H04B 7/18532; H04B 7/18534; H04B 7/18536; H04B 7/18539; H04W 84/06
USPC ...................................................... 455/3.02
See application file for complete search history.

(56) References Cited

U.S. PATENT DOCUMENTS

| | | | |
|---|---|---|---|
| 5,946,603 A | 8/1999 | Ibanez-Meier et al. | |
| 6,400,927 B1* | 6/2002 | Daniel | H04B 7/18513 370/316 |
| 2007/0126647 A1* | 6/2007 | Nelson | H04B 7/18513 343/757 |
| 2012/0209519 A1* | 8/2012 | Basnayake | G01S 5/0072 701/457 |
| 2017/0105153 A1 | 4/2017 | Ashrafi et al. | |
| 2018/0088242 A1 | 3/2018 | Eagling | |

OTHER PUBLICATIONS

International Search Report and Written Opinion for PCT/US2020/043087 dated Nov. 9, 2020 (11 pages).

* cited by examiner

*Primary Examiner* — Philip Sobutka
(74) *Attorney, Agent, or Firm* — Bejin Bieneman PLC

(57) ABSTRACT

A system comprises a computer including a processor and a memory. The memory stores instructions executable by the processor such that the computer is programmed to change a satellite antenna direction from a first sky segment to a second sky segment, to change the satellite antenna direction to return to the first sky segment upon updating segment blockage status data including a location and a score of the second sky segment, and to change the satellite antenna direction to a third sky segment based at least in part on the segment blockage status data.

19 Claims, 5 Drawing Sheets

CHANGING ANTENNA DIRECTION BASED ON SATELLITE BLOCKAGE DETECTION

BACKGROUND

Satellite communication is utilized as a wireless communication technology, e.g., for Internet access, enterprise intranet connectivity, TV (television) broadcasting services, etc. An obstacle in a path between a satellite and a dish antenna may impair the communication of the satellite and the dish antenna.

DETAILED DESCRIPTION

Introduction

Figure 1:
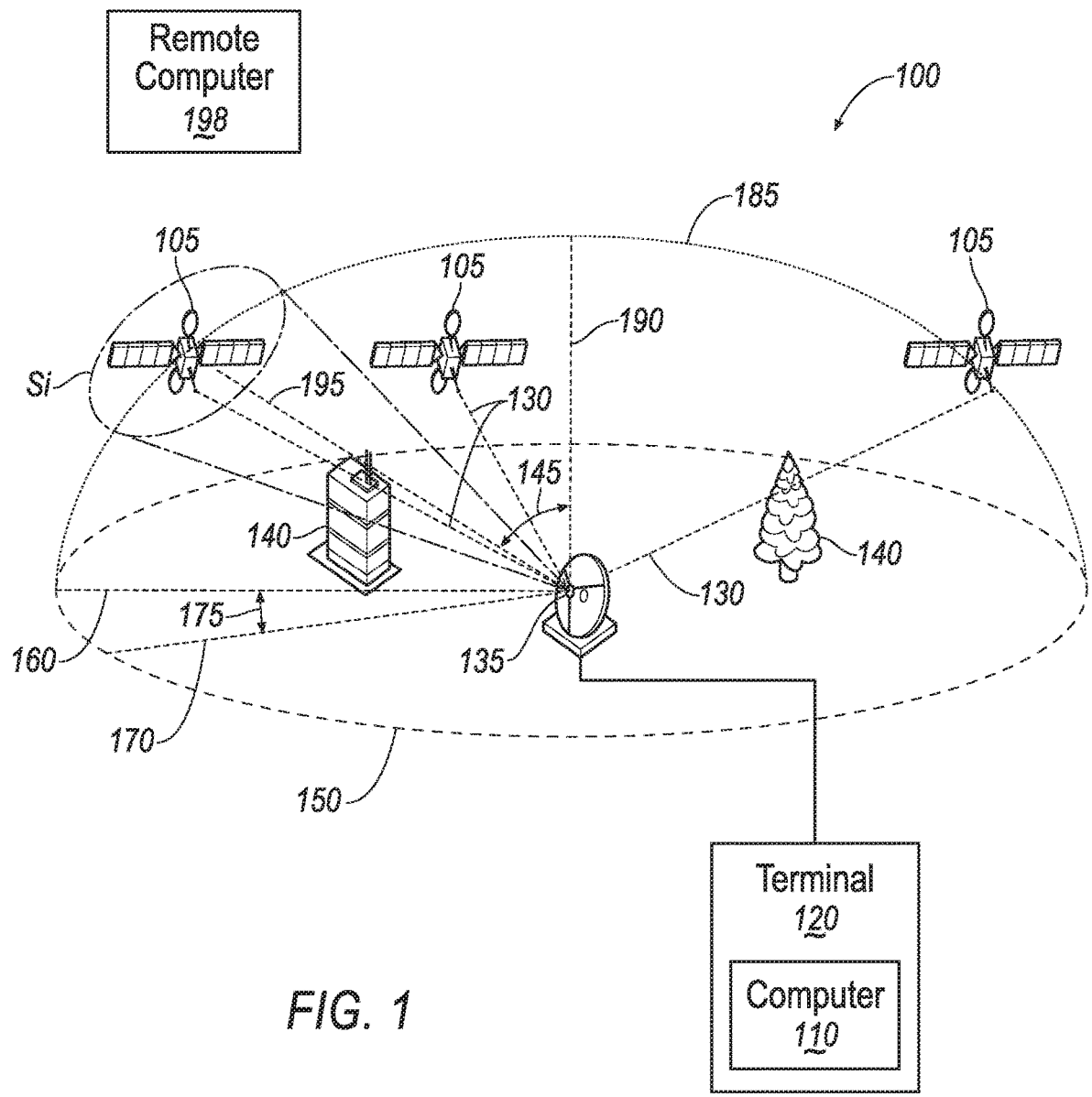
FIG. 1 illustrates an example satellite network.

A system comprises a computer including a processor and a memory. The memory stores instructions executable by the processor such that the computer is programmed to change a satellite antenna direction from a first sky segment to a second sky segment, to change the satellite antenna direction to return to the first sky segment upon updating segment blockage status data including a location and a score of the second sky segment, and to change the satellite antenna direction to a third sky segment based at least in part on the segment blockage status data.

The score may be at least one of fully blocked, medium blocked, low blocked, or unblocked.

The segment blockage status data may further include a type of blockage including at least one of a building, a vegetation, or a weather condition.

The instructions may further include instructions to actuate a steering actuator to switch the antenna direction from the first sky segment to the second sky segment and return to the first sky segment.

The instructions may further include instructions to change the antenna direction to the second sky segment by configuring a phased array antenna while maintaining a communication via a satellite link to a satellite in the first sky segment.

The instructions may further include instructions to identify the third sky segment further based on a rising angle of the third sky segment and a setting angle of the first sky segment.

The instructions may further include instructions to delay the change of the antenna direction to the third sky segment upon determining that a first bandwidth at the first sky segment exceeds a second bandwidth at the third sky segment.

The instructions may further include instructions to iteratively update the blockage status data for each sky segment from a set of sky segments.

The instructions may further include instructions to increase a frequency of updating the blockage status data of the second sky segment upon determining a change in at least one of the score or a type of blockage of the second sky segment that exceeds a threshold.

The instructions may further include instructions to determine the score of blockage based on determining at least one of a low blocked path, a full blocked path, or a multipath-induced fading.

The instructions may further include instructions to determine a frequency of updating the blockage status data of a sky segment based at least in part on an elevation of the sky segment.

The system may further include a remote computer, wherein the computer is included in a satellite terminal and is further programmed to transmit the blockage status data to the remote computer, wherein the remote computer is programmed to actuate a second satellite in the third sky segment to transmit data to the satellite terminal upon determining that a blockage of a first satellite in the first sky segment communicating with the satellite terminal is expected.

The instructions may further include instructions to store location data of the blockage status based on a location and orientation of a moving object upon determining that the satellite antenna is mounted to the moving object.

The instructions may further include instructions to determine a time of switching to the second sky segment based on an active terminal communication.

The blockage status data may further include a change of the score based on a time of day.

Further disclosed herein is a method comprising changing a satellite antenna direction from a first sky segment to a second sky segment, changing the satellite antenna direction to return to the first sky segment upon updating segment blockage status data including a location and a score of the second sky segment, and changing the satellite antenna direction to a third sky segment based at least in part on the segment blockage status data.

The score may be at least one of fully blocked, medium blocked, low blocked, or unblocked.

The segment blockage status data may further include a type of blockage including at least one of a building, a vegetation, or a weather condition.

The method may further include iteratively updating the blockage status data for each sky segment from a set of sky segments.

Further disclosed is a computing device programmed to execute any of the above method steps.

Yet further disclosed is a computer program product comprising a computer readable medium storing instructions executable by a computer processor, to execute the any of the above method steps.

Exemplary System Elements

As disclosed herein, in an overlapping area of satellite coverages, a terminal may communicate with at least one of a plurality of satellites. A satellite link between a satellite and a terminal may be blocked. This may prevent or impair data communication between the satellite and the terminal.

A system comprises a computer that is programmed to change a satellite antenna direction from a first sky segment to a second sky segment, to change the satellite antenna direction to return to the first sky segment upon updating segment blockage status data including a location and a score of the second sky segment, and to change the satellite antenna direction to a third sky segment based at least in part on the segment blockage status data.

As illustrated in FIG. 1, a satellite network 100 includes satellites 105, at least one terminal 120, one or more antennas 135, and gateway(s) (not shown), each of which typically includes one or more computing devices. For example, each of terminal 120 or satellite 105 can include a computer 110. A computer 110 is a machine including a processor and memory. A computer memory can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processors in computers 110 may be programmed to execute instructions stored in the memory to carry out actions of the terminal 120, satellite 105, terminals 120, and gateways, as discussed herein.

The satellites 105 collectively form a constellation (i.e., a group) of network nodes whose position may change relative to one another, to the ground, or both. The satellite 105 include various circuits, chips, or other electronic components. Satellite 105 may be in low Earth orbit (LEO) in multiple planes and orbits relative to one another. Because the satellites 105 are moving relative to the ground, a satellite link 130 served by each respective satellite 105 changes over time. Moreover, because the satellites 105 can move relative to one another, as a first satellite 105 moves, a second satellite 105 available for direct communication may change as the first and/or second satellite 105 moves. In the present context, a "direct communication" is a communication between a satellite 105 and an antenna 135 via a satellite link 130 which is substantially along an imaginary straight line between the satellite 105 and the antenna 135.

In the present context, a satellite link 130 is a wireless communication between an antenna of a terminal 120 and a satellite 105 antenna. A satellite link 130 is typically established upon configuring a terminal 120 modulator, demodulator, encoder, and/or decoder of a terminal 120 to communicate with a satellite 105.

In the present context, a satellite link 130 may include an uplink, i.e., communication from the terminal 120 to a satellite 105 and/or a downlink, i.e., communication from the satellite 105 to the terminal 120. A direction of data transmission from a terminal 120 via an uplink to the satellite is referred to as "in-route," whereas a direction of data transmission from a satellite 105 to a terminal 120 via a downlink is referred to as "out-route." In the present context, a satellite link 130 may include one or more in-route and/or out-routes, with data throughput and threshold evaluation (as discussed below) applicable to a single out-route or multiple out-routes.

Each satellite 105 has a coverage area (not shown). In the present context, a coverage area of a satellite 105 is a geographical area on the surface of Earth, in which a terminal 120 may communicate with the respective satellite 105. In addition to a location of a terminal 120, other factors such as weather conditions, obstacles 140 such as buildings, trees, etc., may partially or fully impair communication of a terminal 120 with a satellite 105 within a respective coverage area. A shape, dimensions, etc., of a coverage area may depend on multiple factors such as a distance of the satellite 105 from the Earth, a width of an electromagnetic beam of the satellite, etc. For example, a wide beam of a satellite 105 may produce a coverage area including a large area, e.g., a country, whereas a narrow beam may produce a coverage area including a metropolitan area.

Based on a shape, dimensions, etc., of coverage areas, the coverage areas may overlap. Alternatively, a coverage area of any number, e.g., 3 or more, of satellites 110 may overlap, e.g., an area of overlap could include an area including the terminal 120 antenna 135, as shown in FIG. 1. Each satellite 105 may have any number (one or more) of beams that cover different coverage areas and/or have one or more areas of overlap. A terminal 120 may be able to communicate with multiple satellites 105, e.g., one at a time or simultaneously, when the antenna 135 is located within an area of overlap.

A terminal 120, e.g., very small aperture terminals (VSAT), is a computer-based communication devices implemented via circuits, chips, antennas 135, or other electronic components that can communicate with satellite 105 that are within communication range of the terminal 120. In some instances, the terminals 120 are stationary relative to a location on Earth. In other instances, the terminals 120 are mobile, meaning that the terminals 120 move relative to a location on the Earth. In some instances, the terminal 120 may provide an interface between a satellite 105 and other ground-based communication devices. For instance, the terminal 120 may receive communications from a satellite 105 and transmit such communications via terrestrial-based communication channels. Likewise, the terminals 120 may receive communications via a terrestrial-based communication channel and transmit the communication to a satellite 105.

The system 100 may include a plurality of terminals 120 at same and/or different geographical locations. Each terminal 120 may be connected to one or more antennas 135. One terminal is shown in FIG. 1 for ease of illustration. A terminal 120 includes a modulator and a demodulator to facilitate communications with satellite 105. Moreover, each terminal 120 may have an encoder to encode outgoing data and/or a decoder to decode received data. Each terminal 120 includes or is communicatively connected to one or more antennas 135, which allow a terminal 120 to communicate with one or more satellite 105 at a time.

The antenna 135 may include a low-noise block downconverter (LNB) mounted on a dish, which may collect radio frequency (RF) signals from the dish and convert the collected RF signal to a signal which is sent through wired connection to the terminal 120. The dish is physically mounted to the LNB and is stationary relative to the LNB. The antenna 135 may be a combination of low-noise amplifier, frequency mixer, local oscillator and intermediate frequency (IF) amplifier. The antenna 135 serves as a radio frequency (RF) front end of a terminal 120, receiving a microwave signal from a satellite 105 collected by the dish, amplifying the received signal, and converting the block of frequencies to a lower block of intermediate frequencies (IF). This conversion of RF to a lower block of IF allows the signal to be carried, typically via a wired connection, to a terminal 120. An antenna 135 typically includes a sender antenna configured to send RF signal to a satellite 105, and/or a receiver antenna configured to receive RF signal from a satellite 105. Additionally or alternatively, the antenna 135 may include a phased array antenna 135.

To establish a satellite link 130 to a satellite 105, a direction of an antenna 135 may be changed. The "direction" of an antenna 135 is defined by (i) an elevation angle 145 of a dish axis 195 relative to a reference line 190 that is perpendicular to a ground surface at the antenna 135 location, and (ii) an angle 175 of a horizontal projection 170 of the axis 195 on the ground surface and a reference line 160 on the ground surface passing through the location of the antenna 135 on the ground surface (or a projection of the location of the antenna 135 on the ground if the antenna 135 is mounted above the ground). In one example, the elevation angle 145 is within a 180 degree range, e.g., between −90 (e.g., an angle between the reference line 190 and a horizontal line extending westward from the antenna 135) and 90 degrees (e.g., an angle between the reference line 190 and a horizontal line extending eastward from the antenna 135) and the angle 175 may be within a range of 0 (zero) and 360 degrees. In one example, the dish includes a motor (or motors) to change the direction of the antenna 135. The computer 110 may be programmed to change the direction of the antenna 135 by actuating the motor(s) to change at least one of the angles 145, 175. Additionally or alternatively, the computer 110 may be programmed to configure a phased array antenna 135 to point in different directions to operate multiple links 130 to different satellites 105.

For a satellite 105 moving across the sky relative to the Earth, a rising angle is an elevation angle 145 of a dish axis 195 pointing toward to the satellite 105 at which no blockage between the satellite 105 and the terminal 120 exists (i.e., the satellite 105 becomes unblocked to the terminal 120 as the elevation angle 145 decreases). A blockage is an obstruction of an RF signal that measurably impairs transmission of the signal between an antenna 135 and a satellite 105 caused by an obstacle 140, weather condition, etc. As discussed below, a blockage may be determined, e.g., as "full", "medium", "low", or "no blockage." Note that the angle 145 decreases as the axis 195 moves toward the vertical reference line 190. A setting angle is an elevation angle 145 at which the satellite 105 becomes blocked (i.e., the satellite 105 becomes blocked to the terminal 120, e.g., through buildings, etc., as the elevation angle 145 increases). In the present context, a satellite 105 "is setting" when a difference between an elevation angle 145 of the dish and the setting angle is less than a threshold, e.g., 5 degrees.

A terminal 120 may communicate with a satellite 105 in a segment $S_i$ of sky when the antenna 135 axis 195 is within a segment $S_i$ of the sky. In other words, the satellite 105 is visible for the antenna 135. In the present context, a sky segment $S_i$ is a volume, e.g., a cone, frustum, etc., defined by a range of elevation angle 145 and a range of angle 175. For example, a segment $S_i$ may be defined as any portion of the sky within an elevation angle 145 range of 105 degrees and 110 degrees, and an angle 175 range within a range of 130 and 135 degrees. For example, the antenna 135 may be located at an apex of a cone or frustum-shaped segment $S_i$. The sky is divided into a plurality of segments $S_i$. For example, the sky may be divided into n segments $S_1, \ldots S_n$. In the present context, the "sky" refers to a hemisphere over the earth defined by horizons around a geographical location of the antenna 135. In one example, the sky may be divided into 100 segments $S_i$. For example, each segment Si may have a range of 36 degrees for the angle 175 (i.e., one tenth of 360 degrees) and a range of 18 degrees for the elevation angle 145. The ranges which define the segments Si may be defined based on technical characteristics of the terminal 120, a total number of satellites 105 in sky, etc. In one example, for a nearly fixed location satellite 105, the segments $S_i$ may be defined based on a width of the antenna 135 beam, e.g., a smaller antenna 135 may have a larger beam width. In another example, for a moving satellite 105, the segments $S_i$ may be defined based on the width of the antenna 135 beam, an amount of time the antenna 135 would dwell at some pointing coordinates and whether there is expected to be a satellite 105 within the segment $S_i$ during the time.

The computer 110 may be programmed to actuate a phased array antenna 135 to change an antenna 135 direction from a first sky segment, e.g., a segment $S_5$ to a second sky segment, e.g., a segment $S_7$. In this example, a change of direction may include a change in a configuration of the phased array antenna 135, i.e., without a physical movement of the antenna 135. Additionally or alternatively, the computer 110 may be programmed to change a phased array antenna 135 direction by actuating a motor to move the antenna 135, i.e., moving the dish and LNB relative to a ground surface. In one example, the computer 110 may be programmed to perform relatively small angle 145, 175 changes, e.g., 30 degrees, by reconfiguring the phased array antenna 135, whereas the computer 110 may actuate the motor to change a direction of the phased array antenna for larger changes, e.g., a change exceeding 30 degrees from a current angle 145, 175.

As discussed above, an obstacle 140 may block a satellite link 130 when a terminal 120 is operating with an antenna 125 pointed to an operating sky segment, referred to herein by convention as the first segment $S_1$. The computer 110 may be programmed, upon detecting a blockage of a satellite link 130, to change a direction of the antenna 135 to from the first segment $S_1$ to another sky segment $S_i$ and start a communication with a second satellite 105. To determine a direction to which the computer 110 may change the antenna 135 to maintain satellite communication, the computer 110 may use status data providing blockage status, etc., for the segments $S_1, \ldots, S_n$. In order to generate and maintain such status data regarding segments $S_1, \ldots, S_n$, assuming that a current operating segment is the segment $S_1$ in the set of segments, the computer 110 may be programmed to iteratively check for blockage status of the other segments $S_2, \ldots, S_n$ in the set, and to store the determined status of each segment $S_2, \ldots, S_n$ in a computer 110 memory. In order to maintain operation of the terminal 120, the computer 110 may in each iteration change the direction of antenna 135 to another segment $S_i$ (where $2 \leq i \leq n$) and then return to the segment $S_1$ currently used for communication.

In one example, the computer 110 can be programmed to change a satellite 105 antenna 135 direction from a first sky segment $S_1$ to a second sky segment $S_i$, e.g., upon ending a specified cycle time, to determine a blockage status of the second segment $S_i$, then to change the satellite 105 antenna 135 direction to return to the first sky segment $S_1$ upon updating blockage status data for the segment $S_i$, including a location and a score of the second sky segment $S_i$, and to change the satellite 105 antenna 135 direction to a third sky segment, e.g., a segment $S_k$ (where $2 \leq k \leq n$ and $k \neq 1$ and $k \neq i$), based at least in part on the segment blockage status data. A blockage is an impaired or lost (i.e., fully blocked) wireless signal due to, e.g., an obstacle 140, weather condition, etc., in a path of communication between a terminal 120 and a satellite 105.

Table 1 shows example segment blockage status data for a segment $S_i$. The blockage status data include data describing any of a score $E_i$, location $L_i$, blockage type $T_i$, bandwidth $B_i$, and time of blockage. The computer 110 may be programmed to store blockage status data for at least a plurality of segments $S_1, \ldots, S_n$.

TABLE 1

| Datum | Description |
| --- | --- |
| Score $E_i$ | A score of a segment may be highly (e.g. fully) blocked, medium blocked, low blocked, or unblocked. The scores may be on a normalized scale, e.g., from 1 to 4 as follows: fully blocked (1), medium blocked (2), low blocked (3), unblocked (4). In one example, a score may be determined based on a percentage of packet loss through the RF signal communication between a terminal and a satellite, e.g., unblocked if 90% or greater transferred with no packet loss, low blocked if 70% or greater but less than 90% transferred without packet loss, medium blocked (if 30% or greater but less than 70% transferred without packet loss), and fully blocked if less than 30% transferred without packet loss. Additionally or alternatively, the score may be determined based burst error, etc. |
| Location $L_i$ | A segment $S_i$ location that includes a range of angles 145, 175 that define the segment $S_i$. Additionally, a segment location may include location coordinates such as GPS (Global Positioning System) coordinates of the dish. For a moving terminal, e.g., attached to a truck, ship, airplane, etc., the location data may include an orientation of the terminal relative to an XY coordinates system on the ground plane. The location coordinates of the terminal stored in the blockage status data may be the last (i.e., most recent) location coordinates determined at a time of updating the blockage status data. |
| Blockage type $T_i$ | A blockage type specifies a cause or reason for a blockage, e.g., a building, vegetation, a weather condition, etc. The types may be stored based on identifiers, e.g. building (1), vegetation (2), weather condition (3), aircraft in a hanger (4), a train in tunnel (5), unknown (6), etc. |
| Bandwidth $B_i$ | Bandwidth available in an $i^{th}$ segment $S_i$. In one example, when multiple satellites 105 are available in the segment $S_i$, then the bandwidth of the segment $S_i$ may be the bandwidth of a satellite 105 with the maximum unblocked bandwidth. |
| Time of blockages | Times during a day that a blockage exists in segment, e.g., 6-8 am, 2-4 pm, etc. In one example, each time of blockage is associated with a change of score and/or blockage type $T_i$ in the respective times. |

A computer 110 in a terminal 120 may be programmed to determine blockage status data of a segment $S_i$ by actuating the antenna 135 to communicate with one or more satellite(s) 105 in the respective segment $S_i$. In one example, the computer 110 may identify the satellite(s) 105 within a segment $S_i$ based on ephemeris data, e.g., received from a remote computer. The ephemeris data provides a moving location of satellites 105 over time based on which the computer 110 can calculate a direction of the antenna 135 in order to be directed to a current location of the satellite 105 in the sky. For example, the ephemeris data could be pairs of time and location, or could also have satellite 105 angular direction/velocity components to calculate values in between the tabulated time/location pairs. In one example, the ephemeris data may be received from the satellite 105 or from some other satellite 105 in the constellation which either relays or originates the remote computer 198 data.

The computer 110 may be programmed to iteratively update the blockage status data for each sky segment $S_i$ in a set of segments $S_2, \ldots, S_n$. In other words, the computer 110 can cause a change of the antenna 135 direction to scan the sky to determine the blockage status of each of the segments $S_2, \ldots, S_n$. In the present context, a "scan" means determining respective blockage statuses of each of the sky segments $S_i$ by iteratively (e.g., every 10 minutes) changing direction of the antenna 135 from the first segment (or actual operating segment) $S_1$ to a next segment $S_i$ and upon determining the blockage status of the next segment $S_i$ return to the current operating segment $S_1$. Assuming a number n of segments is 100, where each cycle of operating at the actual operating segment or first segment is 10 minutes and determining the blockage status of each segment $S_i$ consumes 30 seconds, then one round of scanning (i.e., a complete set of iterations to scan the sky) may continue for 100×10 minutes+100×0.5 minute=1050 minutes. For example, the computer 110 may be programmed to change the antenna 135 direction to a second segment $S_i$ every 10 minutes, update (i.e., overwrite a previous blockage status of the segment $S_i$) the blockage status data of the second segment $S_i$, and then return to the actual operating segment, e.g., the segment $S_1$, to resume communication. In one example, the computer 110 may be programmed to determine a time of switching to (i.e., changing antenna 135 direction to) a second sky segment $S_i$ based on an active terminal communication. For example, upon determining that a high priority user data (e.g., audio communication of a phone call) is being communicated via the satellite 105 link 130, the computer 110 may be programmed to delay a change of antenna 135 direction to a second segment $S_i$. In another example, the computer 110 may be programmed to change of antenna 135 direction to a second segment $S_i$ upon determining that no data traffic is being sent or received for a specified period of time, e.g., 1 minute.

As discussed above, the computer 110 may be programmed to iteratively, e.g., with a cycle time of 10 minutes, change the direction of antenna 135 to another second segment $S_i$ to determine the blockage status of the respective second segment $S_i$. Thus, a frequency of updating a second segment $S_i$ may be once every $$\frac{n}{6}$$

hours (i.e., every 10 minutes a blockage status of one segment $S_i$ is determined). However, segments $S_i$ in lower elevations, e.g., an elevation angle 145 greater than 70 degrees) may be more prone to blockage by obstacles 140, e.g., buildings, vegetation, etc. In one example, the computer 110 may be programmed to determine a first group of segments $S_i$, e.g., with an elevation angle 145 exceeding a threshold 70 degrees and a second group of segment Si, e.g., with an elevation angle 145 less than 70 degrees. The computer 110 may be programmed to update the blockage status data of the first group with a first frequency, e.g., once a week, and the second group with a second frequency, e.g., once a day.

Some obstacles 140 that affect a blockage score $E_i$, e.g., a weather condition, tree foliage, new construction, etc., may change more often than others, e.g., an existing building. Additionally or alternatively, therefore, the computer 110 may be programmed to increase a frequency of updating the blockage status data of the second segment $S_i$ upon determining at least one of a change in a score ($\Delta E_i$) of a blockage of the second segment $S_i$ that exceeds a threshold. A change in a score ($\Delta E_i$) may be defined in a numerical way. For example, a change of score $E_i$ may be determined by using Equation (1). $E_i$ (k) represents a last $k^{th}$ sample of score $E_i$ and $E_i$ (k–1) represents a $(k-1)^{th}$ sample of score E.

$$\Delta Ei = |E_i(k) - E_i(k-1)| \quad (1)$$

The computer 110 may be programmed to store a frequency for updating the blockage status data of each segment $S_i$ in a computer 110 memory, e.g., included in the blockage status data.

As discussed above, the computer 110 may be programmed to change a phased array antenna 135 direction by reconfiguring the phased array antenna 135. In one example, the computer 110 may be programmed to change the antenna 135 direction to a second segment $S_i$ by configuring a phased array antenna 135 while maintaining communication via a satellite link 130 to a satellite 105 in the actual operating segment, e.g., the segment $S_1$.

As shown in Table 1, the computer 110 may be programmed to determine a type $T_i$ of blockage for a segment $S_i$. A blockage of a satellite link 130 may be due to multipath propagation, referred to as multipath-induced fading, a weather condition (e.g., rain), or blocking obstacles 140 (see FIG. 2B) affecting the wave propagation. However, the fade or signal loss characteristics are typically different between that of weather or rain and shadow blockage, and which can be used to distinguish a blockage from the other cases. For example, if there has been no blockage for some extended period of time, e.g., several hours, then upon detecting a blockage, weather can be a likely cause of blockage. In another example, when a slow fading but large-scale fading is detected, it can be interpreted that the blockage is caused by a tall building.

Figure 2A:
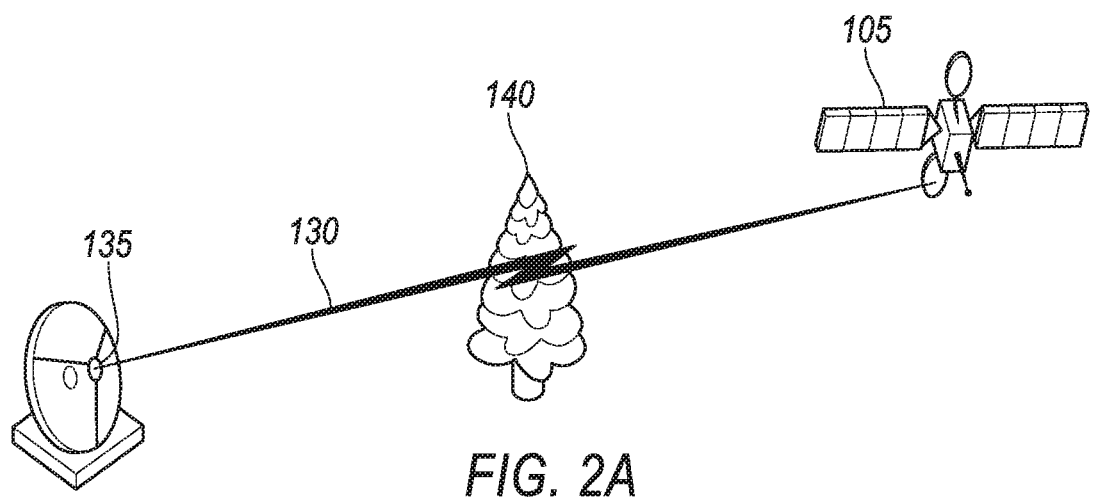
FIG. 2A illustrates an example slight (or low) blockage caused by vegetation.
Figure 2B:
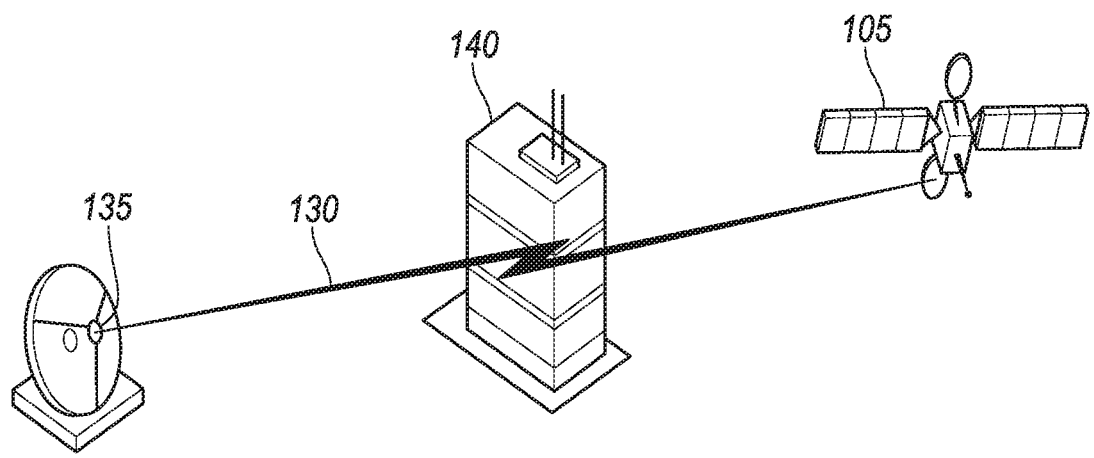
FIG. 2B illustrates an example full blockage caused by a building.
Figure 2C:
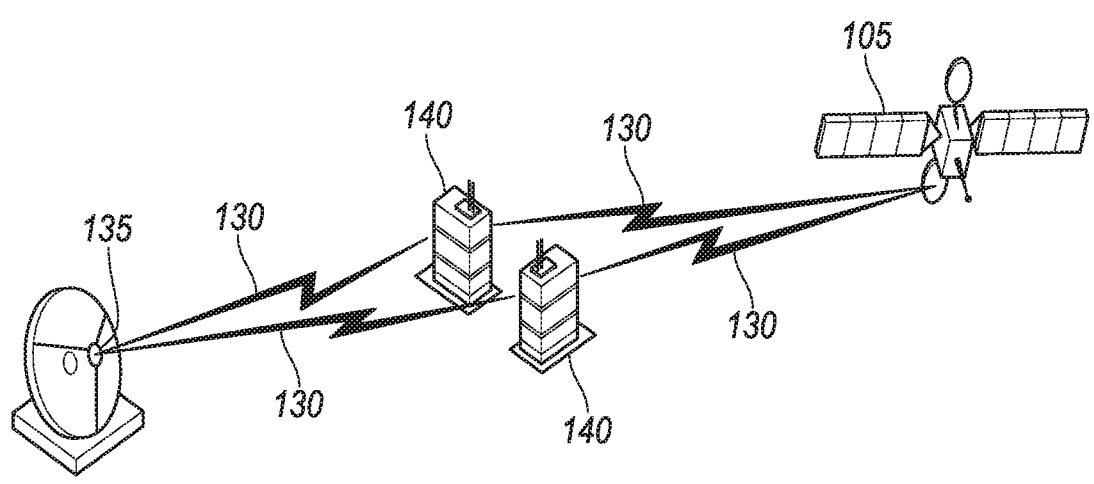
FIG. 2C illustrates an example multi-path blockage caused by multiple buildings.

FIGS. 2A-2C show various examples of blockages. For example, with reference to FIG. 2A, a tree obstacle 140 typically results in a slight shadowed link 130. The computer 110 may be programmed to determine a "low blocked" based on slight fading of signal caused by a tree obstacle 140 and less than a second threshold. With reference to FIG. 2B, a tall building obstacle 140 in a line-of-sight (LOS) of satellite 100 and the antenna 135 can cause a total, i.e., full, blockage. The computer 110 may be programmed to determine a "full blockage" when a building obstacle 140 fully blocks the wave propagation.

With reference to FIG. 2C, when a building obstacle 140 is not fully blocking the LOS, it may produce a multi-path fading due to scattered and reflected paths of the satellite 105 signal. The computer 110 may be programmed to determine a "medium blockage" upon detecting a multi-path fading. When the number of paths from antenna 135 to the satellite 105 increase due to multi-path fading, then a sum approaches a complex Gaussian random variable having independent real and imaginary parts with zero mean and equal variance. Using this model, the computer 110 may be programmed to determine a multipath blockage.

In the present context, a network blockage is a blockage caused by a network outage, i.e., a network outage results in a total lack of communication. A network outage may be caused by a failure of gateway processing or transmission equipment (antenna, antenna tracking, modulator, amplifier, etc.), a power outage, etc. The computer 110 may be programmed to detect a network outage and to omit or skip updating a blockage status after detecting a network outage. The blockage data, in this case, may be updated in a later scan upon detecting that the network outage has ended. The computer 110 may be programmed to detect a network outage upon determining that a number of blocked segments $S_i$ exceeds a specified threshold number, e.g., 20% of segments $S_i$ because this determination is likely to indicate a network outage, i.e., it is unlikely that a large number (exceeding the threshold) of segments Si are all fully blocked at a time. For example, the computer 110 may be programmed to assign weights/priorities for periodic segment $S_i$ recheck so that suspicious changes are checked more often. The checks are further based on ephemeris data of satellites 105. For example, a given segment $S_i$ was unblocked this morning but this afternoon the terminal the satellite 140 is blocked in that segment $S_i$—that is a good candidate to be detected as a network outage or weather. The terminal 120 could remember that the segment $S_i$ used to work, and revisit it more often in the periodic sky scan to sort out something transient from longer lasting blockage.

With reference to FIG. 1, the computer 110 may be programmed to identify the new operating sky segment $S_k$ (where 2≤k≤n and k≠1 and k≠i), based at least in part on blockage status data for the segment $S_k$. Thus, the computer 110 may be programmed to change an antenna 135 direction based on the blockage status data to maintain terminal 120 communication with a remote computer, e.g., the Internet. For example, the computer 110 may be programmed to change the antenna 135 direction to the segment $S_k$ based on a rising angle of the new operating (i.e., new current) sky segment $S_k$ (i.e., rising angle of a satellite 105 in the new operating sky segment $S_k$) and a setting angle of the old operating segment, e.g., the segment $S_1$. As one example, the computer 110 may be programmed to change the antenna 135 direction from an unblocked satellite 105 in the actual operating segment $S_1$ that is setting (e.g., a difference between the elevation angle 145 and the setting angle is less than 5 degrees) to an unblocked satellite 105 in the new operating sky segment $S_k$ that is rising (e.g., an elevation angle 145 to the satellite 105 in the new operating sky segment $S_k$ exceeds a threshold such as 5 degrees). Note that the computer 110 may change the antenna 135 direction with respect to either of the angles 145, 175 to switch to the new operating sky segment $S_k$ based on its location $L_k$. The computer 110 may identify the satellite 105 in the new operating sky segment $S_k$ based on received ephemeris data.

In another example, the computer 110 may be further programmed to delay the change of the antenna 135 direction to the new operating sky segment $S_k$ upon determining that a first bandwidth at the actual operating segment, e.g., the bandwidth $BW_1$ of the segment $S_i$, exceeds a second bandwidth, e.g., a bandwidth $BW_k$ at the new operating segment $S_k$. In other words, upon determining that a switching from, e.g., the actual operating segment $S_1$ to the new operating sky segment $S_k$ results in a reduction of bandwidth, then the computer 110 may be programmed to delay the change of antenna 135 direction, e.g., delaying the switching until an elevation angle 145 of the satellite 105 in, e.g., the actual operating segment $S_1$, is less than a second threshold, e.g., 2 degrees.

The terminal 120 computer 110 may be programmed to send the blockage status data to a remote computer, e.g., a remote server 198, which is programmed to actuate a second satellite 105 in the new operating sky segment $S_k$ to transmit data to the terminal 120 upon determining that a blockage of a first satellite 105 in the old current operating sky segment $S_1$ communicating with the terminal 120 is expected. In other words, the remote computer 198 determines that sending data via the second satellite 105 may result in maintaining communication with the terminal 120 via the second satellite 105. The remote computer 198 may further send an instruction to the terminal 120 to change the antenna 135 direction to the new operating sky segment $S_k$. Thus, in this example, the remote computer maintains communication of satellites 105 with terminals 120 based on received blockage status data from the terminals 120.

Figure 3:
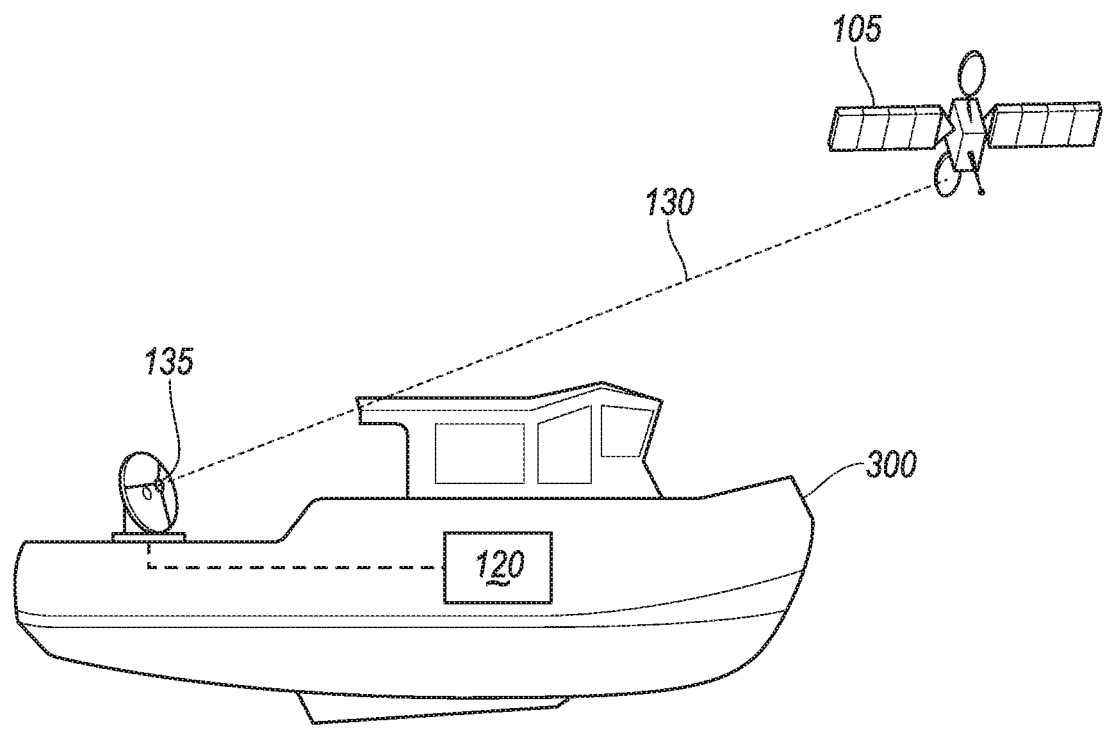
FIG. 3 illustrates an example blockage of a satellite terminal in a moving object.

With reference to FIG. 3, the terminal 120 may be mounted to a moving object such as a truck, a ship, an airplane, etc., i.e., a boat or ship 300 in the example of FIG. 3. As shown in Table 1, the location $L_i$ of a segment $S_i$ may further include an orientation of the terminal 120 on the ground plane. Upon movement of the object, e.g., the ship 300, the respective locations of segments $S_i$ in the blockage status data may change. For example, the satellite 105 shown in FIG. 3 is blocked at the illustrated location and orientation of the ship 300. However, upon a change of orientation and/or location of the ship 300, the blocked satellite 105 may become unblocked. The computer 110 may be programmed to store a segment $S_i$ location $L_i$ based on a location and orientation of a moving object 300 upon determining that the terminal 120 is mounted to the moving object 300. For example, as the ship 300 moves and/or changes its direction, a range of elevation angle 145 that is included in a segment location $L_i$ changes. Thus, the segment location $L_i$ is updated based on movements of a moving object, e.g., the ship 300.

The computer 110 may be programmed to update the location $L_i$ of the segments $S_1, \ldots, S_n$ upon determining a change of direction or a change of location of the terminal 120, e.g., based on data received from a GPS sensor of the moving object 300. For example, the computer 110 may be programmed to update the angles 145, 175 stored in the blockage status data of each segment $S_i$ based on a current location and/or orientation of the object 300 and the last location and/or orientation of the object 300 stored in the blockage status data. For example, the computer 110 may use conventional triangulation techniques to determine updated location $L_i$ of segments $S_i$ upon a change of location and/or orientation of the object 300.

Figure 4A:
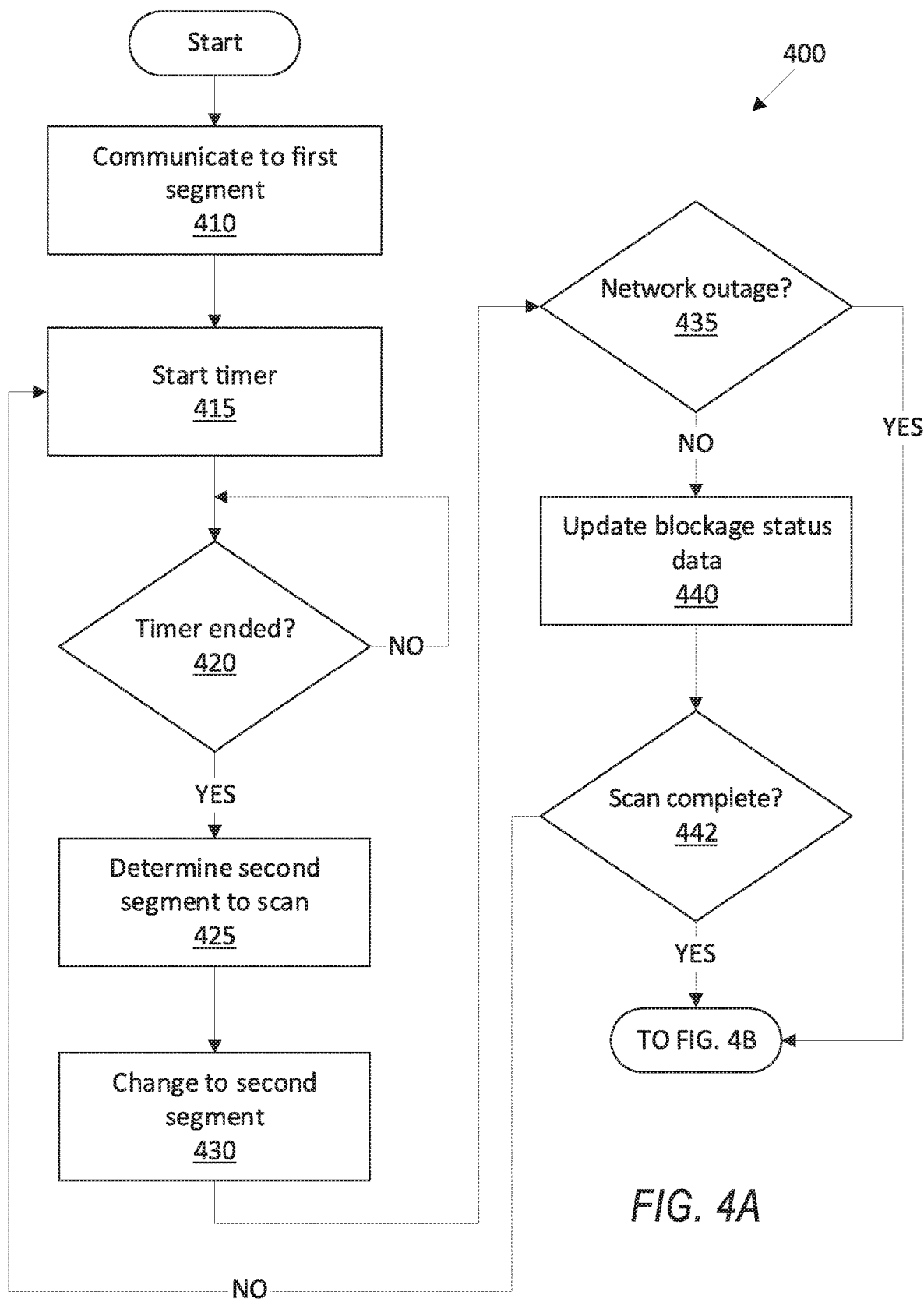
FIGS. 4A-4B are a flowchart of an example process for operating the satellite terminal of FIG. 1.
Figure 4B:
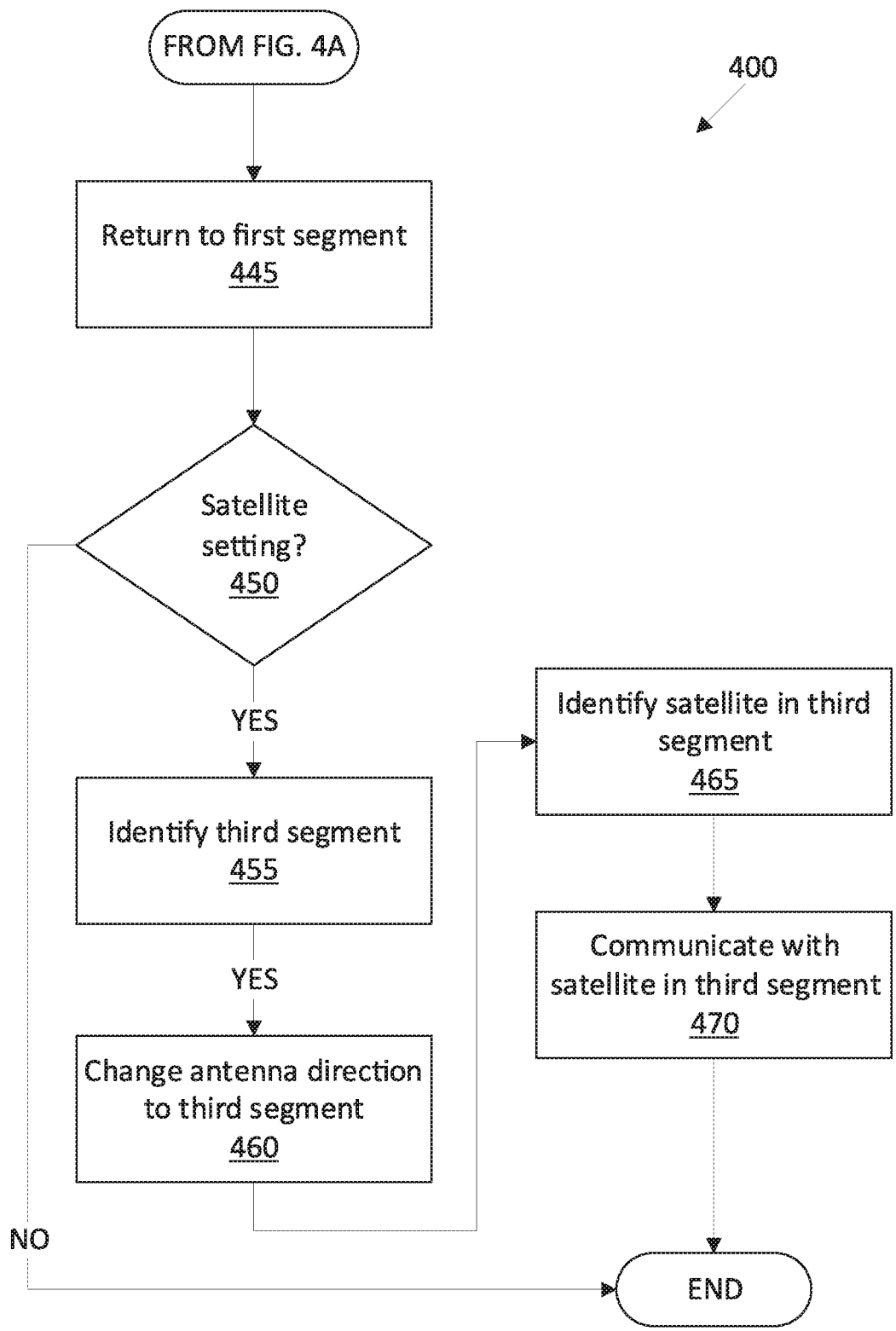

FIGS. 4A-4B are a flowchart of a process 400 for operating a satellite terminal 120. For example, a terminal 120 computer 110 may be programmed to execute blocks of the process 400.

The process 400 begins in a block 410, in which the computer 110 actuates the antenna 135 to communicate with a satellite 105 in a current operating segment $S_1$. Note that the first current segment $S_1$ is typically selected from a stored set of n segments, and is designated by convention, i.e., to indicate that $S_1$ is a first or current operating segment upon executing the process 400. The computer 110 can further assign unique (within the set) index integers 2 . . . n, e.g., randomly, to respective other segments in an identified set of segments that could be used for the terminal 120 to communicate with a satellite 105. The terminal 120 may communicate with a satellite 105 based on previously stored data in a computer 110 memory and/or a preset direction of the antenna 135 toward the segment $S_1$. The terminal 120 may send data to the satellite 105 and/or receive data from the satellite 105.

Next, in a block 415, the computer 110 starts a delay timer, e.g., 10 minutes. Upon respective expirations of the delay timer, the computer 110 initiates scanning of a respective segment $S_1, \ldots, S_n$ of the sky.

Next, in a decision block 420, the computer 110 determines whether the timer ended (or elapsed). Additionally, the computer 110 may be programmed to, upon determining an active satellite 105 communication, e.g., a high priority communication such as a phone call, etc., to extend the timer until the active communication ends. If the timer ends, the process 400 proceeds to a block 425; otherwise the process 400 returns to the decision block 420.

In the block 425, the computer 110 determines a segment $S_i$ to scan. In one example, the computer 110 selects one of the segments $S_2, \ldots, S_n$ to determine the blockage status thereof. Typically, the selected segment $S_i$ for determining the blockage status is any of the segments $S_1, \ldots S_n$ except the current operating segment $S_i$. Further, the computer 110 could be programmed not to select a segment whose status has been checked on a prior iteration of the process 400. That is, each time the process 400 reaches the block 425, the computer 110 may select a new, i.e., previously unchecked, segment $S_i$ from the segments $S_2, \ldots, S_n$.

Next, in a block 430, the computer 110 changes the antenna 135 direction to the determined current segment $S_i$ to be scanned. In one example, the computer 110 may be programmed to actuate a motor or motors to change the direction of antenna 135 by moving the antenna 135 based on the location $L_i$ of the determined segment $S_i$. The computer 110 may be programmed to change the antenna 135 direction by changing at least one of the angles 145, 175. Additionally or alternatively, the antenna 135 may include a phased array antenna 135 and the computer 110 may be programmed to actuate the phased array antenna 135 to change a direction of the antenna 135. In this example, the computer 110 may be programmed to change the direction of the phased array antenna 135 to the second segment while the computer 110 maintains the communication with the satellite 105 in the actual operating segment $S_1$.

Next, in a decision block 435, the computer 110 determines whether there is a network outage. The computer 110 may be programmed to determine that there is a network outage upon determining that a number of segments for which the terminal 120 has not received an RF signal exceeds a threshold number, e.g., 20% of segments $S_1, \ldots, S_n$. For example, upon determining that at least n/5 number of segments $S_1, \ldots, S_n$ are fully blocked within a specified amount of time, the computer 110 may be programmed to determine a network outage. Additionally or alternatively, the computer 110 may be programmed to determine a network outage based on data received from a satellite 105 (which is not affected by the network outage) and/or data received via a wired and/or terrestrial communication network. If the computer 110 determines a network outage, then the process 400 proceeds to a block 445 (see FIG. 4B); otherwise the process 400 proceeds to a block 440.

In the block 440, the computer 110 updates the blockage status data of the segment $S_i$ selected in the block 425. The computer 110 may be programmed to update the blockage status of the selected second segment $S_i$ upon identifying satellite(s) 105 in the segment $S_i$. Alternatively, the computer 110 may be programmed not to update the blockage status of the segment $S_i$ upon determining based on ephemeris data that no satellite 105 is available in the segment $S_i$ or no communication can be established within a specified time, e.g., 30 seconds. Additionally, as discussed with reference to FIG. 3, the terminal 120 may be mounted to a moving object, e.g., a ship 300. The computer 110 may be programmed to receive the orientation of the moving object and to update the respective locations $L_i$ of segments in the set $S_1, \ldots, S_n$ upon determining a change of the location, and/or direction of the object 300 (typically without updating blockage statuses of any segments except the segment $S_i$ being evaluated based on selection in the block 425 in the current iteration of the process 400).

Next, in a decision block 442, the computer 110 determines whether a scan of sky segments $S_2, \ldots, S_n$ is complete. Note, scan of sky segments $S_2, \ldots, S_n$ includes determining blockage status of the segments $S_2, \ldots, S_n$ which may, at least in some examples, cover a portion of the sky, e.g., a hemisphere. The computer 110 may be programmed to determine that the scan of segments $S_2, \ldots, S_n$ is complete upon determining that the blockage status of at least all other segments $S_2, \ldots, S_n$ except the actual or current operating segment, e.g., the segment $S_1$, is updated (the process 400 is typically executed for segments $S_2, \ldots, S_n$ as discussed above, in some examples, the process 400 could also be executed for the segment $S_1$, i.e., the block 425 could include selection in one iteration of the process 400 of the current or actual operating segment $S_1$.) If the computer 110 determines that the scan of sky is complete, then the process 400 proceeds to the block 445 (see FIG. 4B); otherwise the process 400 returns to the block 415.

Now continuing with reference to FIG. 4B, in the block 445, the computer 110 changes the direction of the antenna 135 to the actual operating segment, e.g., the segment $S_1$. For example, the computer 110 may be programmed to change the antenna 135 direction to return to the actual operating segment $S_1$ based on the location $L_1$ of the segment $S_1$. Additionally or alternatively, the antenna 135 may include a phased array and the computer 110 may be programmed to configure the phased array antenna 135 to change the direction of the antenna 135 to the actual operating segment $S_1$. As discussed above, the computer 110 may be programmed to actuate the phased array antenna 135 to maintain the communication to the actual operating segment $S_1$ while scanning a second segment $S_i$. In this example, the computer 110 may actuate the phased array antenna 135 to stop scanning the second segment $S_i$ while the communication with the satellite 105 in the actual operating segment $S_1$ continues.

Next, in a decision block 450, the computer 110 determines whether the actual operating segment $S_1$ is setting. In one example, the computer 110 may be programmed to determine that the actual operating segment $S_1$ is setting upon determining that (i) a score $E_1$ of the actual operating segment $S_1$ is medium blocked or fully blocked, (ii) a difference between the elevation angle 145 of the antenna 135 and the setting angle of the actual operating segment $S_1$ is less than a threshold, e.g., 5 degrees, and/or (iii) a bandwidth $B_1$ of the actual operating segment $S_1$ is less than a threshold, e.g., 1 Gb/s. If the computer 110 determines that the actual operating segment $S_1$ is setting, then the process 400 proceeds to a block 455; otherwise the process 400 ends (thus, the computer 110 may continue operation by communicating with the satellite 105 in the actual operating segment).

In the block 455, the computer 110 identifies a new operating sky segment $S_k$, for changing the direction of the antenna 135 based on the blockage status data. The new operating sky segment $S_k$ may be any of the segments $S_2, \ldots, S_n$, i.e., any segment except the current or actual operating segment $S_1$. In one example, the computer 110 may be programmed to identify the new operating sky segment $S_k$ based on a rising angle and/or setting angle of the segment $S_k$ as discussed above. In another example, the computer 110 may be programmed to identify a new operating sky segment $S_k$ further based on one or more bandwidths $B_1, \ldots, B_n$ of respective segments $S_1, \ldots, S_n$. For example, the computer 110 may be programmed to identify a new operating sky segment $S_k$ that has a bandwidth $B_k$ exceeding a requested bandwidth of the terminal 120 and the segment is unblocked or slightly blocked. Additionally or alternatively, the computer 110 may be programmed to identify the new operating sky segment $S_k$ based on a time of day and the blockage times stored in the blockage status data.

Next, in a block 460, the computer 110 changes the direction of the antenna 135 to the identified new operating sky segment $S_k$. The computer 110 may be programmed to change the direction of the antenna 135 to the new operating sky segment $S_k$ by actuating the steering actuator of the antenna 135, and/or reconfiguring the phased array antenna 135.

Next, in a block 465, the computer 110 identifies a satellite 105 in the new operating sky segment $S_k$. The computer 110 may be programmed to identify the satellite 105 based on the received ephemeris data.

Next, in a block 470, the computer 110 communicates with a satellite 105 in the new operating sky segment $S_k$. For example, the computer 110 may be programmed to identify the satellite 105 in the new operating sky segment, e.g., the segment $S_k$, based on the received ephemeris data. Note, upon changing the direction of the antenna 135 and starting operation of the terminal 120 via a link 130 to a satellite 105 in the new operating sky segment $S_k$, the segment $S_7$ becomes the actual operating sky segment.

Following the block 470, the process 400 ends or alternatively returns to the block 410. Additionally or alternatively, although not shown in FIGS. 4A-4B, the computer 110 may be programmed to group the segments $S_1, \ldots, S_n$ in a plurality of groups with different frequencies of scanning. As discussed above, the segments $S_i$ in lower elevations may be more prone to blockage by obstacles 140, e.g., buildings, vegetation, etc., compared to segments $S_i$ in higher elevations. The computer 110 may be programmed to update the blockage status data of a first group with a first frequency, e.g., once a week, and a second group with a second frequency, e.g., once a day.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising:
a computer including a processor and a memory, the memory storing instructions executable by the processor such that the computer is programmed to:
change a satellite antenna direction from a first sky segment currently used for communication to a second sky segment based on at least one of a specified cycle time or a priority of user data being communicated via the first sky segment;
change the satellite antenna direction to return to the first sky segment to resume the communication after scanning the second sky segment and updating segment blockage status data including a location and a score of the second sky segment; and
change the satellite antenna direction to a third sky segment for maintaining communication based at least in part on the segment blockage status data.

2. The system of claim 1, wherein the score is at least one of fully blocked, medium blocked, low blocked, or unblocked.

3. The system of claim 1, wherein the segment blockage status data further includes a type of blockage including at least one of a building, a vegetation, or a weather condition.

4. The system of claim 1, wherein the instructions further include instructions to actuate a steering actuator to switch the antenna direction from the first sky segment to the second sky segment and return to the first sky segment.

5. The system of claim 1, wherein the instructions further include instructions to change the antenna direction to the second sky segment by configuring a phased array antenna while maintaining a communication via a satellite link to a satellite in the first sky segment.

6. The system of claim 1, wherein the instructions further include instructions to identify the third sky segment further based on a rising angle of the third sky segment and a setting angle of the first sky segment.

7. The system of claim 1, wherein the instructions further include instructions to delay the change of the antenna direction to the third sky segment upon determining that a first bandwidth at the first sky segment exceeds a second bandwidth at the third sky segment.

8. The system of claim 1, wherein the instructions further include instructions to iteratively update the blockage status data for each sky segment from a set of sky segments.

9. The system of claim 1, wherein the instructions further include instructions to increase a frequency of updating the blockage status data of the second sky segment upon determining a change in at least one of the score or a type of blockage of the second sky segment that exceeds a threshold.

10. The system of claim 1, wherein the instructions further include instructions to determine the score of the blockage based on determining at least one of a low blocked path, a full blocked path, or a multipath-induced fading.

11. The system of claim 1, wherein the instructions further include instructions to determine a frequency of updating the blockage status data of a sky segment based at least in part on an elevation of the sky segment.

12. The system of claim 1, further comprising a remote computer, wherein the computer is included in a satellite terminal and the instructions further include instructions to transmit the blockage status data to the remote computer, wherein the remote computer is programmed to actuate a second satellite in the third sky segment to transmit data to the satellite terminal upon determining that a blockage of a first satellite in the first sky segment communicating with the satellite terminal is expected.

13. The system of claim 1, wherein the instructions further include instructions to store location data of the blockage status based on a location and orientation of a moving object upon determining that the satellite antenna is mounted to the moving object.

14. The system of claim 1, wherein the instructions further include instructions to determine a time of switching to the second sky segment based on an active terminal communication.

15. The system of claim 1, wherein the blockage status data further include a change of the score based on a time of day.

16. A method comprising:
 changing a satellite antenna direction from a first sky segment currently used for communication to a second sky segment based on at least one of a specified cycle time or a priority of user data being communicated via the first sky segment;
 changing the satellite antenna direction to return to the first sky segment to resume the communication after scanning the second sky segment and updating segment blockage status data including a location and a score of the second sky segment; and
 changing the satellite antenna direction to a third sky segment for maintaining communication based at least in part on the segment blockage status data.

17. The method of claim 16, wherein the score is at least one of fully blocked, medium blocked, low blocked, or unblocked.

18. The method of claim 16, wherein the segment blockage status data further includes a type of blockage including at least one of a building, a vegetation, or a weather condition.

19. The method of claim 16, further comprising iteratively updating the blockage status data for each sky segment from a set of sky segments.

* * * * *